US011276033B2

(12) United States Patent
Karmakar et al.

(10) Patent No.: US 11,276,033 B2
(45) Date of Patent: Mar. 15, 2022

(54) SYSTEM AND METHOD FOR FINE-TUNING SALES CLUSTERS FOR STORES

(71) Applicant: Walmart Apollo, LLC, Bentonville, AR (US)

(72) Inventors: Somedip Karmakar, Kolkata (IN); Sourit Manna, Hooghly (IN); Gayatri Pal, Kodigehalli (IN)

(73) Assignee: Walmart Apollo, LLC, Bentonville, AR (US)

( * ) Notice: Subject to any disclaimer, the term of this patent is extended or adjusted under 35 U.S.C. 154(b) by 75 days.

(21) Appl. No.: 16/205,604

(22) Filed: Nov. 30, 2018

(65) Prior Publication Data

US 2019/0205823 A1 Jul. 4, 2019

Related U.S. Application Data

(60) Provisional application No. 62/636,904, filed on Mar. 1, 2018.

(30) Foreign Application Priority Data

Dec. 28, 2017 (IN) .............................. 201741046965

(51) Int. Cl.
*G06Q 10/08* (2012.01)
*G06Q 30/02* (2012.01)

(52) U.S. Cl.
CPC ....... *G06Q 10/087* (2013.01); *G06Q 30/0204* (2013.01)

(58) Field of Classification Search
None
See application file for complete search history.

(56) References Cited

U.S. PATENT DOCUMENTS

| 7,386,519 | B1 | 6/2008 | Delurgio |
| 7,979,299 | B1 | 7/2011 | Mehta |
| 8,103,538 | B2 | 1/2012 | Bamberg |
| 8,666,976 | B2 | 3/2014 | Merz |

(Continued)

FOREIGN PATENT DOCUMENTS

| CA | 3018381 A1 | 10/2017 | |
| CA | 3087587 A1 * | 1/2021 | .............. H04W 4/35 |

(Continued)

OTHER PUBLICATIONS

Xavier Dreze et. al., "Shelf Management and Space Elasticity," 1994, Journal of Retailing, vol. 70, pp. 301-326 (Year: 1994).*

(Continued)

*Primary Examiner* — Amanda Gurski
(74) *Attorney, Agent, or Firm* — Fitch, Even, Tabin & Flannery LLP

(57) ABSTRACT

Based upon the transition information for all the retail stores, a determination is made of an average cluster retention score. The average cluster retention score is a measure of how many retail stores have moved from original to different existing sales clusters in the current sales period. When the average cluster retention score is below a predetermined threshold, a complete re-organization of the existing sales clusters is performed. When the average cluster retention score is above the predetermined threshold, a determination is made as to whether each retail store should be re-classified.

10 Claims, 15 Drawing Sheets

(56) References Cited

U.S. PATENT DOCUMENTS

| | | |
|---|---|---|
| 8,838,469 B2 | 9/2014 | Bottom |
| 9,256,832 B2 | 2/2016 | Shim |
| 9,336,302 B1 | 5/2016 | Swamy |
| 9,785,953 B2 | 10/2017 | Desal |
| 10,503,788 B1 | 12/2019 | Kumar |
| 2007/0112618 A1 | 5/2007 | Krneta |
| 2007/0288296 A1 | 12/2007 | Lewis |
| 2008/0052302 A1 | 2/2008 | Dolley |
| 2008/0294996 A1 | 11/2008 | Hunt |
| 2010/0228604 A1* | 9/2010 | Desai ............... G06Q 30/0202 |
| | | 705/7.31 |
| 2010/0318403 A1* | 12/2010 | Bottom ............... G06Q 30/02 |
| | | 705/7.36 |
| 2011/0238461 A1 | 9/2011 | Mulukutla |
| 2012/0278091 A1 | 11/2012 | Yaseen |
| 2012/0317059 A1 | 12/2012 | Joshi |
| 2013/0090988 A1 | 4/2013 | Moore |
| 2014/0058781 A1 | 2/2014 | Padmanabhan |
| 2014/0344118 A1 | 11/2014 | Parpia |
| 2016/0055495 A1 | 2/2016 | Qin |
| 2016/0297611 A1 | 10/2016 | Williams |
| 2016/0304281 A1 | 10/2016 | Elazary |
| 2017/0148084 A1* | 5/2017 | Axelsson ............ G06F 16/2457 |
| 2017/0323376 A1* | 11/2017 | Glaser ............... G06Q 20/203 |
| 2019/0205806 A1 | 7/2019 | Karmakar |

FOREIGN PATENT DOCUMENTS

| | | |
|---|---|---|
| GB | 2583291 | 10/2020 |
| WO | 2019133323 | 7/2019 |
| WO | 2019133337 | 7/2019 |

OTHER PUBLICATIONS

International Search Report and Written Opinion of PCT/US2018/065980, dated Mar. 26, 2019, p. 1-13.

International Search Report and Written Opinion of PCT/US2018/066209, dated Mar. 14, 2019, p. 1-15.

USPTO; U.S. Appl. No. 16/206,025; Office Action dated Feb. 14, 2020; (pp. 1-24).

Dreze, X., et.al, Shelf Management and Space Elasticity, 1994, Journal of Retailing, vol. 70, Issue 4, pp. 301-326 (Year: 1994).

PCT; App. No. PCT/US2018/065980; International Preliminary Report on Patentability dated Jul. 9, 2020.

PCT; App. No. PCT/US2018/066209; International Preliminary Report on Patentability dated Jul. 9, 2020.

USPTO; U.S. Appl. No. 16/206,025; Notice of Allowance dated Nov. 10, 2020; (pp. 1-11).

* cited by examiner

| Old Clusters | Nearest Clusters based on new sales ||||  Total |
| | 1 | 2 | 3 | 4 | |
|---|---|---|---|---|---|
| 1 | 780 | 10 | 4 | 6 | 800 |
| 2 | 9 | 990 | 1 | 0 | 1000 |
| 3 | 18 | 0 | 1970 | 12 | 2000 |
| 4 | 90 | 200 | 100 | 10 | 400 |
| Total | | | | | 4200 |

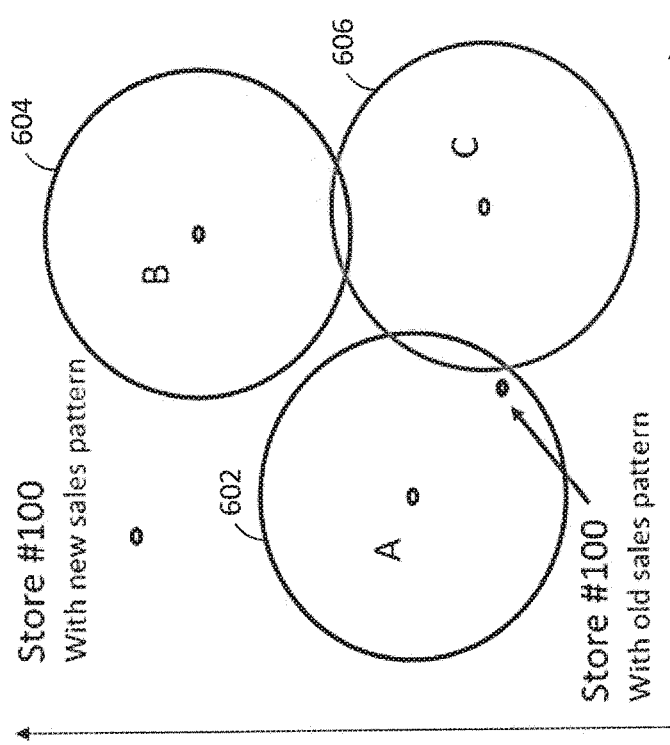
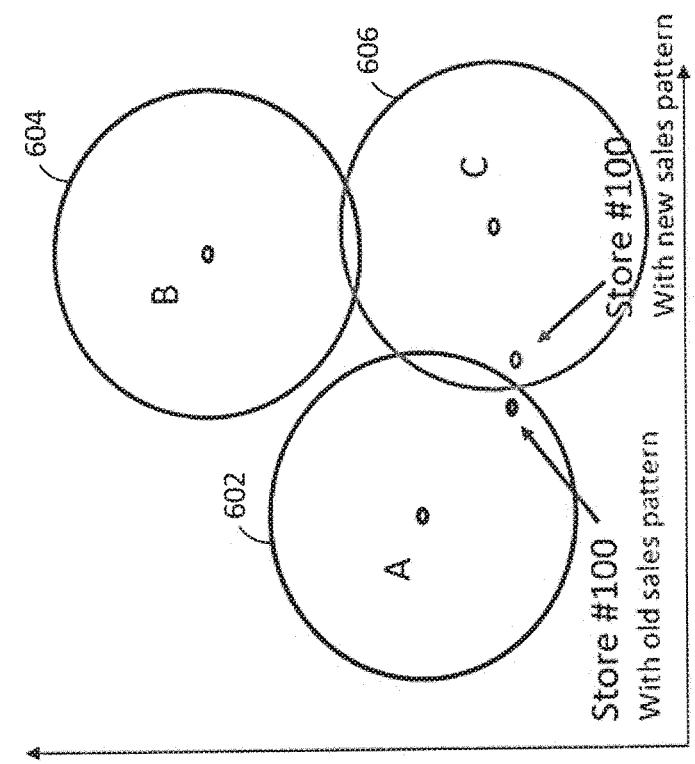
FIG. 6

FIG. 13

Sales 1 (1302) — 1310:
S1V1M1 ⊛, S1V1M2, S1V1M3, S1V1M4 ⊛, S1V2M1, S1V2M2, S1V2M3 ⊛, S1V2M4 ⊛, S1V3M1, S1V3M2, S1V3M3, S1V3M4, S1V3M5, S1V3M6 ⊛

Sales 2 (1304):
S2V1M1 ⊛, S2V1M2, S2V1M3 ⊛, S2V1M4, S2V1M5 ⊛, S2V2M1, S2V2M2, S2V2M3 ⊛, S2V2M4, S2V2M5, S2V2M6 ⊛, S2V3M1 ⊛, S2V3M2, S2V3M3, S2V3M4 ⊛, S2V3M5, S2V3M6

Sales 3 (1306) — 1310:
S3V1M1 ⊛, S3V1M2, S3V1M3, S3V1M4, S3V1M5 ⊛, S3V1M6, S3V2M1, S3V2M2, S3V2M3, S3V2M4, S3V2M5, S3V2M6, S3V3M1, S3V3M2, S3V3M3, S3V3M4, S3V3M5

Sales 4 (1308):
S4V1M1, S4V1M2 ⊛, S4V1M3 ⊛, S4V1M4 ⊛, S4V2M1, S4V2M2, S4V2M3, S4V3M1, S4V3M2, S4V3M3

(1312 indicates marked entries)

FIG. 14

| Sales cluster | Velocity bucket | Micro cluster | Catg YoY growth | Catg Share of Dept. | Customer Segmentation Score | Importance Score | Performance Score | focus | modular_cluster |
|---|---|---|---|---|---|---|---|---|---|
| 1 | 1 | S1V1M1 | 12% | 10% | 4% | 0.474 | 0.687 | 1 | 1 |
| 1 | 1 | S1V1M4 | -1% | 9% | 4% | 0.363 | -0.827 | 1 | S1V1M4 |
| 1 | 2 | S1V2M3 | 23% | 8% | 5% | 0.996 | 3.814 | 1 | 1 |
| 1 | 2 | S1V2M4 | -1% | 9% | 4% | 0.371 | -1.702 | 1 | S1V2M4 |
| 1 | 3 | S1V3M3 | 2% | 9% | 8% | 0.376 | 0.947 | 1 | 1 |
| 1 | 3 | S1V3M6 | -7% | 15% | 5% | 0.803 | -1.833 | 1 | S1V3M6 |
| 2 | 1 | S2V1M1 | 8% | 9% | 7% | 0.383 | 0.637 | 1 | 2 |
| 2 | 1 | S2V1M5 | 30% | 8% | 5% | 1.340 | 2.828 | 1 | 2 |
| 2 | 2 | S2V2M3 | 7% | 10% | 8% | 0.501 | 1.798 | 1 | 2 |
| 2 | 2 | S2V2M6 | 7% | 9% | 6% | 0.301 | 0.912 | 1 | 2 |
| 2 | 3 | S2V3M1 | 3% | 10% | 7% | 0.310 | 0.470 | 1 | 2 |
| 2 | 3 | S2V3M4 | 3% | 11% | 9% | 0.490 | 1.623 | 1 | 2 |
| 3 | 1 | S3V1M1 | 13% | 6% | 4% | 0.535 | 1.056 | 1 | 3 |
| 3 | 1 | S3V1M5 | 0% | 7% | 2% | 0.457 | -1.105 | 1 | S3V1M5 |
| 3 | 1 | S3V1M6 | 29% | 10% | 4% | 1.393 | 3.434 | 1 | 3 |
| 4 | 1 | S4V1M2 | 7% | 8% | 2% | 0.356 | 0.054 | 1 | 4 |
| 4 | 1 | S4V1M3 | 7% | 7% | 3% | 0.356 | 0.079 | 1 | 4 |
| 4 | 1 | S4V1M4 | 8% | 9% | 3% | 0.390 | 0.425 | 1 | 4 |

1402

SYSTEM AND METHOD FOR FINE-TUNING SALES CLUSTERS FOR STORES

CROSS-REFERENCES TO RELATED APPLICATIONS

This application claims the benefit of the following Indian Provisional Application 201741046965 filed Dec. 28, 2017 and the following U.S. Provisional Application No. 62/636,904 filed Mar. 1, 2018, both of which contents are incorporated herein by reference in their entireties.

TECHNICAL FIELD

These teachings relate to clustering retail stores into groups and, more specifically, to assigning optimal clusters to these groups.

BACKGROUND

Retail stores typically have millions of items that can be organized into thousands of categories. The items are arranged in patterns or configurations relative to each other in the store. The arrangements are made to preferably to maximize sales of the products. Each store may have a demand pattern that reflects the choices made by customers in the nearby locality, their demographics, psychographics, geographical preferences, and overall and local trends.

The store layout and arrangement of the products is often captured in a planogram. When very few stores are involved (e.g., a single store or two stores) a unique planogram may be assigned to each store. However, assigning a unique planogram for each store (or each store category combination) is not practical for large numbers of stores and/or for stores that are spread over large geographical areas. For example, it is difficult to implement such a system over large number of stores because supplying, staffing, and arranging items according to a different pattern in each store would be difficult and/or costly to accomplish.

BRIEF DESCRIPTION OF THE DRAWINGS

The above needs are at least partially met through the provision of approaches that determine and/or fine-tune optimal sales clusters for retail stores, particularly when studied in conjunction with the drawings, wherein:

FIG. 6 comprises a diagram as configured in accordance with various embodiments of these teachings;

FIG. 13 comprises a diagram as configured in accordance with various embodiments of these teachings;

FIG. 14 comprises a diagram as configured in accordance with various embodiments of these teachings;

DETAILED DESCRIPTION

Figure 1:
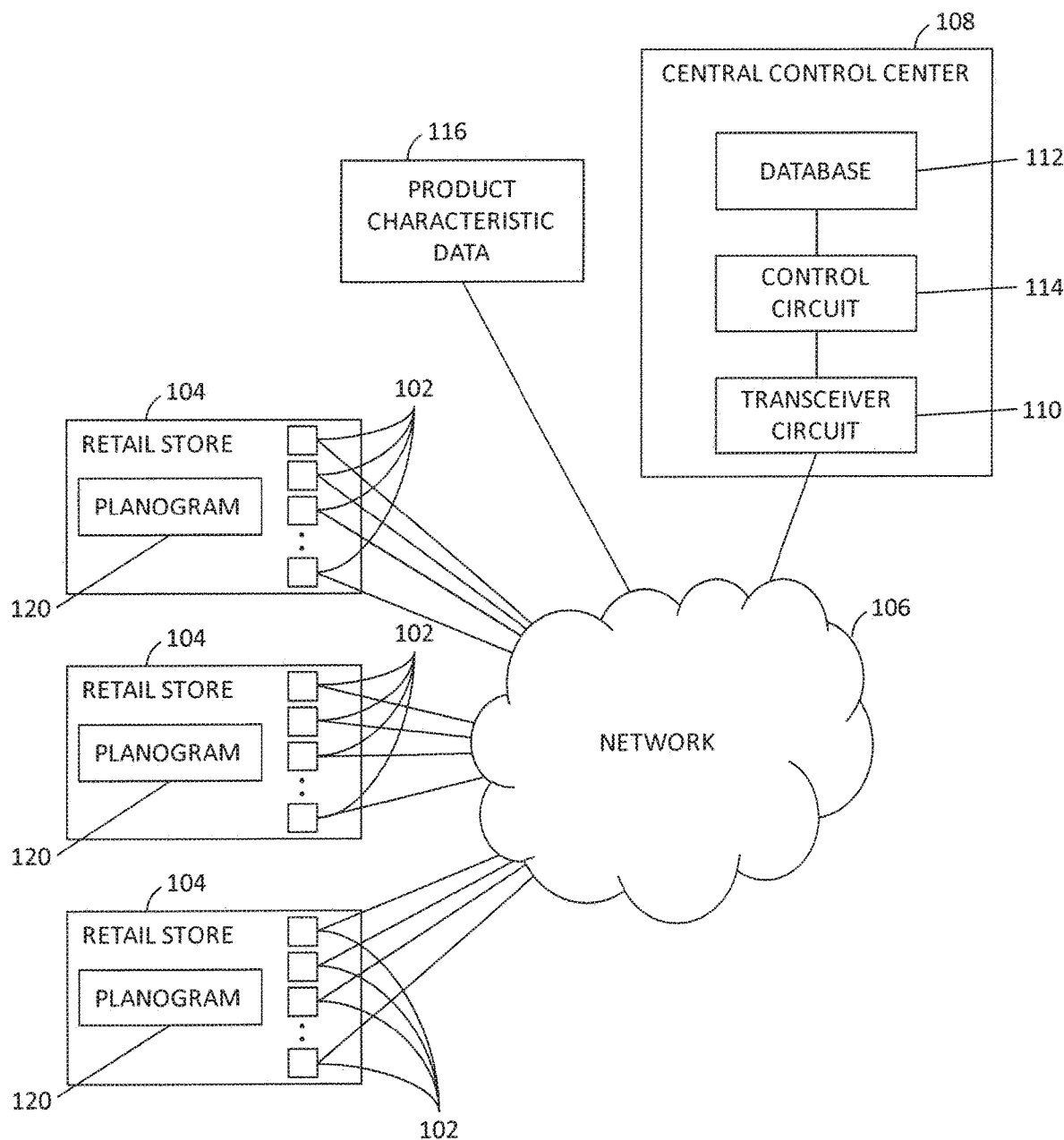
FIG. 1 comprises a diagram of a system as configured in accordance with various embodiments of these teachings.

Generally speaking, a retail store cluster arrangement is maintained to be as accurate as possible over varying time periods. In examples, a previous store cluster assignment is validated and scored against the current demand pattern and if the validation scoring suggests a large proportion of reclassifications for stores, then the entire cluster arrangement is re-done according to the new demand patterns. Otherwise, the existing cluster assignment is maintained with minor movement of stores to better suit the current demand pattern. New cluster may also be created for outlier stores.

In other aspects, model governance and scoring is performed. For a given product category, store clustering has already been performed and the sales pattern remain similar after a time period implying that the existing clustering arrangement remains the same or almost the same. A determination is made as to whether a new clustering arrangement is needed, if the stores can be reclassified into one of the existing demand clusters, or if a new cluster of stores needs to be created for the outliers.

In examples, the governance methodology is to score the stores based on this year (TY) sales and last year (LY) cluster centers. A calculation is made as to the transition percentages from each store to new nearest LY cluster, and this will indicate the potential changes needed in an existing cluster. An identification is made as to the nearest cluster for a store which has least transition percentage. A transition matrix may be created. From the transition matrix, a score is determined that will determine whether a completely new clustering arrangement is needed, or if stores can be re-classified to different, existing clusters.

In one example of a reclassification approach, the stores are re-classified to the cluster whose cluster center is closest to the TY sales pattern of the store. Other examples are possible.

A confidence score represents the competitive advantage the chosen cluster has over the other clusters. A high value of confidence score often means that the distance of the store is much closer to the chosen cluster compared to other clusters. A low value of the confidence score typically implies that the distance of the store from the chosen cluster and the next best cluster is not great. If the confidence score is very low, it generally means that a given store is not similar to any of the clusters. In this case, the store can be treated separately as an outlier or may be added to a different (or newly created) cluster.

In many of these embodiments, a system for updating planograms includes a plurality of sales entry devices, a transceiver circuit, a database, and a control circuit.

The plurality of sales entry devices are configured to collect current sales data at a plurality of retail stores during a current sales period. The transceiver circuit is disposed at a central processing center, and is configured to receive the current sales data. The database is disposed at the central processing center and is configured to store the current sales data and additionally store a representation of existing sales clusters of retail stores. Each of the existing sales clusters includes a subset of the plurality of retail stores such that each retail store belongs to one of the existing sales clusters. Each of the existing sales clusters is assigned an existing planogram.

The control circuit is disposed at the central processing center, and is coupled to the transceiver circuit and the database. Based upon the current sales data, transition information is determined that identifies retail stores that have potentially moved from an original one of the existing sales clusters to a different one of the existing sales clusters. Based upon the transition information for all the retail stores, an average cluster retention score is determined. The average cluster retention score is a measure of how many retail stores have moved from original to different existing sales clusters in the current sales period.

When the average cluster retention score is below a predetermined threshold, a complete re-organization of the existing sales clusters is performed based at least in part upon the current sales data. When the average cluster retention score is above the predetermined threshold, a determination is made as to whether each retail store should be re-classified as belonging to a different existing sales cluster or should be placed in a newly created sales cluster. An optimal planogram for each retail store based at least in part upon whether a complete re-organization is performed, whether the retail store is re-classified as belonging to a different existing sales cluster, or whether the real store is placed in a newly created sales cluster.

The optimal planogram when implemented is effective to maximize store performance. An action is selectively implemented based upon the optimal planogram. The action includes using a robot, automated vehicle, or human to stock the stores according to the planogram. The action is communicated to the human, automated vehicle, or robot via the transceiver circuit.

In other aspects, the transition information is organized according to a transition matrix that indicates transitions of the retail stores between different ones of the existing sales clusters.

In other examples, the determination of whether retail stores are re-classified or placed in a newly created cluster is based upon a confidence score. The confidence score indicates the likelihood a particular retail store belongs to an existing sales cluster. In other aspects, the confidence score represents a competitive advantage one existing sales cluster has over another existing sales cluster.

In still other examples, the optimal planogram is an existing planogram or a newly-created planogram. In other examples, the current sales data is this-year sales data.

In some other aspects, the existing sales clusters each have a cluster center. The retail store is re-classified to the existing sales cluster having the closest cluster center to the retail store according to the current sales data.

In others of these embodiments, current sales data is collected at a plurality of sales entry devices at a plurality of retail stores during a current sales period. The current sales data is received at a central processing center.

The current sales data and a representation of existing sales clusters of retail stores are stored at a database disposed at the central processing center. Each of the existing sales clusters including a subset of the plurality of retail stores such that each retail store belongs to one of the existing sales clusters. Each of the existing sales clusters being assigned an existing planogram.

Based upon the current sales data and at a control circuit that is disposed at the central processing center, transition information is determined that identifies retail stores that have potentially moved from an original one of the existing sales clusters to a different one of the existing sales clusters.

Based upon the transition information for all the retail stores, a determination is made at the control circuit of an average cluster retention score. The average cluster retention score is a measure of how many retail stores have moved from original to different existing sales clusters in the current sales period When the average cluster retention score is below a predetermined threshold, a complete re-organization of the existing sales clusters is performed at the control circuit based at least in part upon the current sales data.

When the average cluster retention score is above the predetermined threshold, the control circuit determines whether each retail store should be re-classified as belonging to a different existing sales cluster or should be placed in a newly created sales cluster. The control circuit determines an optimal planogram for each retail store based at least in part upon whether a complete re-organization is performed, whether the retail store is re-classified as belonging to a different existing sales cluster, or whether the real store is placed in a newly created sales cluster.

The optimal planogram, when implemented, is effective to maximize store performance. The control circuit selectively implements an action based upon the optimal planogram. The action includes using a robot, automated vehicle, or human to stock the stores according to the planogram.

In others of these embodiments, a system updates planograms that are used to arrange products in retail stores. The system includes a plurality of retail stores. Shelving units are disposed in each of the plurality of retail stores and the shelving units configured to display products to customers.

A plurality of automated vehicles or robots is deployed in the plurality of retail stores. A plurality of sales entry devices are deployed at the retail stores and are configured to collect current sales data at the plurality of retail stores during a current sales period.

A transceiver circuit is disposed at a central processing center. The transceiver circuit is configured to receive the current sales data.

A database is disposed at the central processing center and is configured to store the current sales data and additionally store a representation of existing sales clusters of retail stores. Each of the existing sales clusters includes a subset of the plurality of retail stores such that each retail store belongs to one of the existing sales clusters. Each of the existing sales clusters is assigned an existing planogram.

A control circuit is disposed at the central processing center. The control circuit is coupled to the transceiver circuit and the database.

The control circuit is configured to, based upon the current sales data, determine transition information that identifies retail stores that have potentially moved from an original one of the existing sales clusters to a different one of the existing sales clusters. The control circuit is further configured to, based upon the transition information for all the retail stores, determine an average cluster retention score. The average cluster retention score is a measure of how many retail stores have moved from original to different existing sales clusters in the current sales period.

The control circuit is configured to, when the average cluster retention score is below a predetermined threshold, perform a complete re-organization of the existing sales clusters based at least in part upon the current sales data. The control circuit is configured to, when the average cluster retention score is above the predetermined threshold, determine whether each retail store should be re-classified as belonging to a different existing sales cluster or should be placed in a newly created sales cluster. The control circuit is configured to determine an optimal planogram for each retail store based at least in part upon whether a complete re-organization is performed, whether the retail store is re-classified as belonging to a different existing sales cluster, or whether the real store is placed in a newly created sales cluster, the optimal planogram when implemented being effective to maximize store performance.

The control circuit is configured to selectively implement an action based upon the optimal planogram. The action includes using the automated vehicle or robot to stock the shelving units in the stores according to the planogram. The action is communicated to the automated vehicle or robot via the transceiver circuit. The stocking is accomplished by moving or rearranging products within the retail stores to the shelving units in the retail stores. The action also includes reconfiguring at least one of the shelving units in at least one of the plurality of retail stores.

Referring now to FIG. 1, a system that determines and implements optimal planograms in retail stores to maximize store performance includes a plurality of sales entry devices 102 at a plurality of retail stores 104, a network 106, a central processing center 108 (including a transceiver circuit 110, a database 112, and a control circuit 114).

The sales entry devices 102 are configured to collect current sales data at a plurality of retail stores. In examples, the sales entry devices 102 may be cash registers, scanners, or other types of devices that obtain sales data of products sold to customers in a retail store. The retail stores 104 are any type of retail store (or potentially wholesale distributor) that sell products or services to the public. Each of the retail stores 104 includes shelving units that present products to customers. The arrangement of the shelving units and/or products is specified by a planogram. Automated vehicles (e.g., drones, automated ground vehicles) and robots are deployed at the stores 104. As described elsewhere herein, the automated vehicles and/or robots may be used to physically implement the planograms obtained according to the approaches described herein. The robots may be stationary or moveable through the retail stores 104 and include arms or other members that can secure and/or move products or adjust shelving units.

The network 106 is any electronic communication network or combination of networks. The central processing center 108 is any centralized center at a central location such as a company headquarters.

The transceiver circuit 110 is disposed at the central processing center 108 and is configured to receive the sales data, and additionally receive product characteristic data 116 for products stocked in the plurality of retail stores 104. The transceiver circuit 110 may be any combination of computer hardware or software. The data 116 may be received from a variety of different sources such as the manufacturers, suppliers, or distributors of the various products.

The database 112 is any type of memory storage device. The database 112 is disposed at the central processing center 108, and is configured to store the current sales data and a representation of existing sales clusters of retail stores.

The control circuit 114 is disposed at the central processing center 108. The control circuit 114 is coupled to the transceiver circuit 110 and the database 112. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 114 may be configured (for example, by using corresponding programming stored in a memory as will be well understood by those skilled in the art) to carry out one or more of the steps, actions, and/or functions described herein.

In aspects, the control circuit 114 may be implemented as processing elements operated in parallel. These parallel processors implement virtual machines the execute the approaches described herein. These approaches increase the speed of cluster organization, in some cases, by many hours (e.g., 6 hours).

The control circuit 114 is configured to, based upon the current sales data, determine transition information that identifies retail stores that have potentially moved from an original one of the existing sales clusters to a different one of the existing sales clusters. Based upon the transition information for all the retail stores, a determination is made at the control circuit 114 an average cluster retention score. The average cluster retention score is a measure of how many retail stores have moved from original to different existing sales clusters in the current sales period When the average cluster retention score is below a predetermined threshold, a complete re-organization of the existing sales clusters is performed at the control circuit 114 based at least in part upon the current sales data.

When the average cluster retention score is above the predetermined threshold, the control circuit 114 determines whether each retail store should be re-classified as belonging to a different existing sales cluster or should be placed in a newly created sales cluster. The control circuit 114 determines an optimal planogram for each retail store based at least in part upon whether a complete re-organization is performed, whether the retail store is re-classified as belonging to a different existing sales cluster, or whether the real store is placed in a newly created sales cluster.

The optimal planogram, when implemented, is effective to maximize store performance. The control circuit 114 selectively implements an action based upon the optimal planogram. The action includes using a robot, automated vehicle, or human to stock the stores according to the planogram. Robots, automated vehicles, or humans can be instructed using electronic instructions to adjust, move, or alter shelving units in the stores to conform to the planogram or other requirements. The robots or automated vehicles may communicate with each other and coordinate their actions. For example, the robots or automated vehicles may determine or assign roles (e.g., one automated vehicle moves products from a backroom to the sales floor, while another places the product on the shelf).

In one example of the operation of the system of FIG. 1, the chosen level of item groups for clustering purposes is four groups (e.g., G1, G2, G3 and G4; these could represent Yellow Cheddar, White Cheddar, Blue Cheese and Mozzarella cheeses). In this example, the share of sales at these levels are calculated for TY sales for all the stores. From LY sales, the LY cluster centers may be determined.

Assume that in last year there were three clusters, C1, C2 and C3, with LY cluster centers being (C1->0.1,0.4,0.3,0.2), (C2->0.4,0.3,0.1,0.2), (C3->0.3,0.1,0.1,0.5). Now, the TY pattern for one particular store, say store No. 5 is (0.3,0.2, 0.2,0.3). Assume that this store belonged to cluster 3 during the last year.

In the present approach, this store will be assigned by the control circuit 114 to the cluster to which the distance is minimum. In this case Euclidean distance (sum of squared difference) of this store from these 3 cluster centers are 0.1, 0.04 and 0.06 respectively. So, store 5 is closest to C2 LY center. Consequently, store 5 will move from cluster 3 to cluster 2. In other words, the store has been scored and reassigned.

After this initial assignment a cross-table or confusion matrix of this year and last year cluster assignments are made which is the transition matrix. From this determination, the average retention proportion is calculated which will determine whether we go ahead with this reclassification option or perform the entire clustering from scratch.

If, in this case the cluster retention score is 0.8, which in some examples may be considered to be quite high, it is not desirable to perform clustering from scratch and only reclassify some of the stores.

The confidence score of the reclassification will be=min (dist)/(second·min(dist))=0.04/0.06=0.67, which is also quite high. So, this store is reclassified to cluster 2 with high confidence.

"Transition percentage" means the proportion of stores which have transitioned from Cluster I to Cluster j. This is a particular cell in a transition matrix. In aspects, reclassification occurs when the average cluster retention>a threshold value, for example, 0.75; otherwise, an entire re-clustering again (re-organization) is performed.

Figure 2:
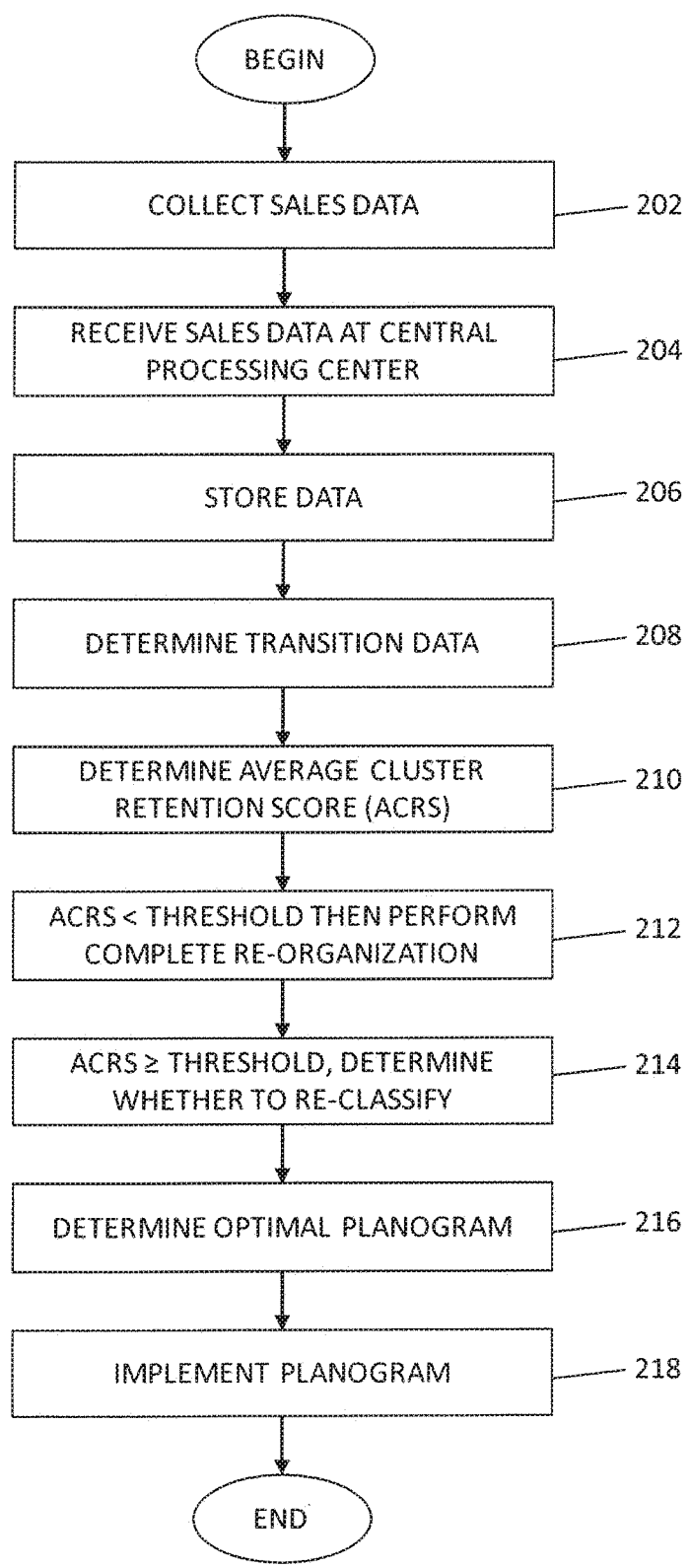
FIG. 2 comprises a flowchart as configured in accordance with various embodiments of these teachings.

Referring now to FIG. 2, an approach for fine-tuning existing sales clusters is described. At step 202, current sales data is collected at a plurality of sales entry devices at a plurality of retail stores during a current sales period.

At step 204, the current sales data is received at a central processing center.

At step 206, the current sales data and a representation of existing sales clusters of retail stores are stored at a database disposed at the central processing center. Each of the existing sales clusters includes a subset of the plurality of retail stores such that each retail store belongs to one of the existing sales clusters. Each of the existing sales clusters is assigned an existing planogram.

At step 208 and based upon the current sales data and at a control circuit that is disposed at the central processing center, transition information is determined. The transition information identifies retail stores that have potentially moved from an original one of the existing sales clusters to a different one of the existing sales clusters. This information can be included and stored in a matrix.

At step 210 and based upon the transition information for all the retail stores, a determination is made at the control circuit an average cluster retention score. The average cluster retention score is a measure of how many retail stores have moved from original to different existing sales clusters in the current sales period.

At step 212 and when the average cluster retention score is below a predetermined threshold, a complete re-organization of the existing sales clusters is performed at the control circuit based at least in part upon the current sales data.

At step 214 and when the average cluster retention score is above the predetermined threshold, the control circuit determines whether each retail store should be re-classified as belonging to a different existing sales cluster or should be placed in a newly created sales cluster.

At step 216, the control circuit determines an optimal planogram for each retail store based at least in part upon whether a complete re-organization is performed, whether the retail store is re-classified as belonging to a different existing sales cluster, or whether the real store is placed in a newly created sales cluster. The optimal planogram when implemented is effective to maximize store performance. The optimal planogram may be formed according to planogram formation techniques that consider a store's traffic pattern, sales data, item size, or other item characteristics to mention a few examples.

At step 218, the control circuit selectively implements an action based upon the optimal planogram. The action includes using a robot, automated vehicle, or human to stock the stores according to the planogram. In examples, automated vehicles may move or adjust shelving units or other display units that hold products. This can include moving shelves, moving products, or both. Labels or other items on, attached to, or associated with the product may also be changed, replaced, exchanged or altered by the robots, automated vehicles, or humans. Automated vehicles can communicate with each or a central processing center to coordinate their actions. For example, one automated vehicle may be assigned or determine to move products, while another automated vehicle (in coordination with other automated vehicles may determine to physically adjust the shelving units.

Figure 3:
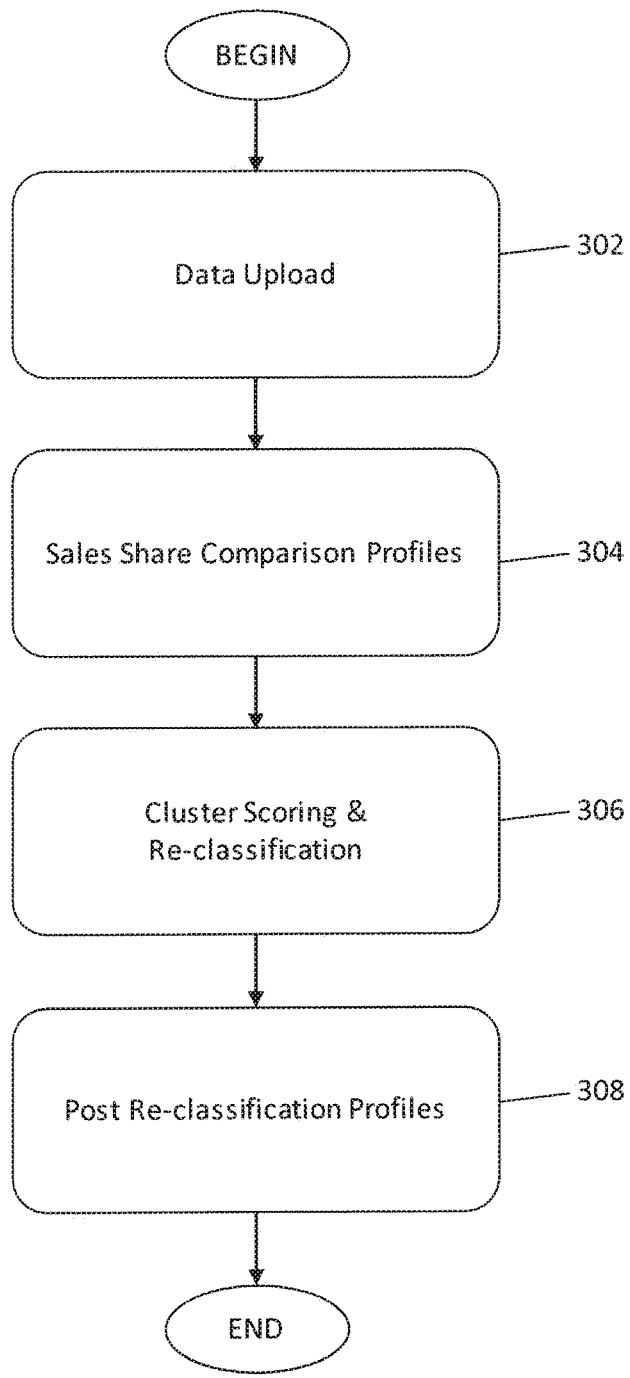
FIG. 3 comprises a flowchart as configured in accordance with various embodiments of these teachings.

Referring now to FIG. 3, one example of an approach for fine-tuning existing clustering arrangements is described. At step 302, a data upload is performed to a tool. The tool may be located at any location such as at a portable electronic device or at a central processing center. The upload may include a cluster mapping arrangement, sales data from last year, sales data from this year, and transactional and demographic data from this year. Other examples are possible.

At step 304, sales chare comparison profiles may be obtained and rendered. For example, a comparison can be made using H-bar charts of last year data and this year data with last year clusters. Year over Year (YoY) change in sales share with respect to least year clusters and nationally may also be made.

At step 306, cluster scoring and re-classification is performed. In aspects, this step includes the creation of a cluster level scoring matrix, the identification of the optimal cluster for each store, and finding the confidence score of re-classification for each cluster. A calculation of cluster retention score may be made same cluster percentages, and potential outliers.

At step 308, re-classification profiles may be posted. A new cluster assignment may be downloaded, cluster maps displayed, H-bar comparisons made, and demographic profiles shown.

Figure 4:
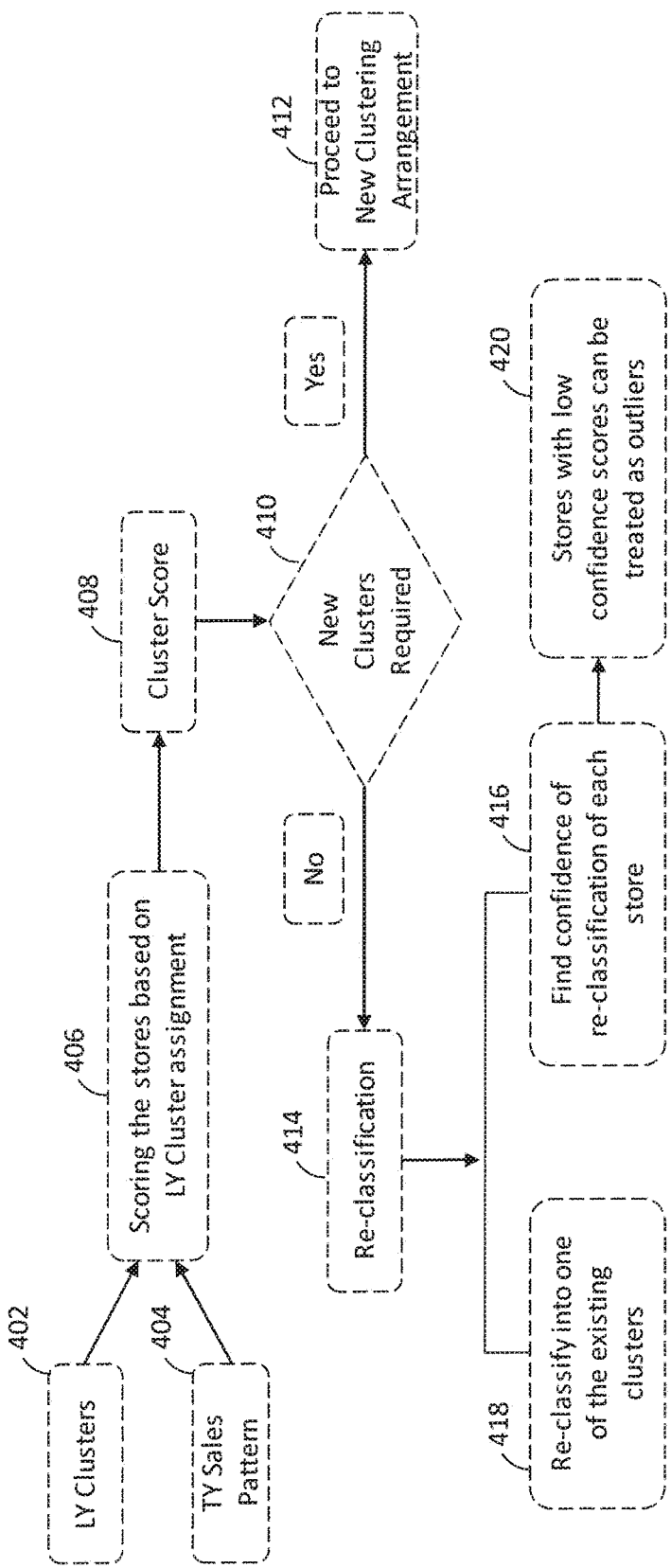
FIG. 4 comprises a flowchart as configured in accordance with various embodiments of these teachings.

Referring now to FIG. 4, an approach for fine-tuning sales clusters is described. Last year cluster assignment data 402 and this-year sales pattern data 404 are received, for example, at a portable electronic tool or central processing center.

At step 406, scoring of the stores based upon the last year cluster assignment data 402 is performed. The scoring may determine distances from the retail store to the cluster center. At step 408, a cluster score is determined.

At step 410, it is determined if new clusters are needed. This may be determined, for example, by determining and average cluster retention score using a matrix. If the answer at step 410 is affirmative, then a new clustering arrangement is obtained at step 412. This new clustering arrangement may be obtained by any approach, including any of the approaches described herein.

If the answer at step 410 is negative, at step 410 is negative, at step 412 reclassification of the retail store is performed at step 414. At step 416, the confidence of re-classification to an optimal cluster is determined. If the confidence is high (e.g., above a threshold), then the retail store can be re-classified to an existing cluster at step 418. However, if the confidence is low (e.g., the confidence level is at or below a threshold), then the store may be treated as an outlier at step 420. At step 420, a new cluster may be created, and the outlier retail store assigned to that cluster.

Figure 5:
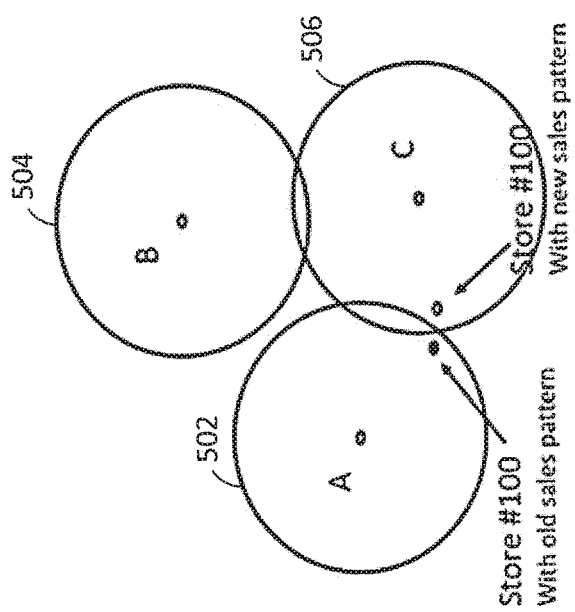
FIG. 5 comprises a diagram as configured in accordance with various embodiments of these teachings.

Referring now to FIG. 5, one example of determining a cluster retention score is described. In this example, three clusters 502, 504, and 506 exist. A store #100 moves from the first cluster 502 to the third cluster 506.

The stores are scored based upon this year's sales data and last year's cluster organization. A transition percentage may be calculated from each store to a new last year cluster, which will indicate the potential changes needed in the existing cluster arrangement.

For each store, the nearest cluster is identified which has the least transition percentage. A transition matrix may be created. From the transition matrix, a cluster retention score is determined. The retention score determines whether a new clustering arrangement is needed, or stores can be re-classified into existing clusters.

In this example, a cluster matrix 508 is created. For example, the matrix indicates that 780 stores that were in cluster 1, stayed in cluster 1. 10 stores that were in cluster 1 moved to cluster 2.

The average cluster retention score is (780/800+990/1000+1970/2000+10/400)/4=0.74. If this cluster score is too low (e.g., less than 0.8), a new clustering arrangement may be needed.

Referring now to FIG. 6, one example of an approach for re-classifying retail stores in a clustering arrangement is described. In this example three clusters 602, 604, and 606 exist. In a first scenario 608, a retail store #100 moves from the first cluster 602 to the third cluster 606. In a second scenario 610, the retail store #100 moves outside all the clusters 602, 604, and 606. In later scenario 610, a new cluster needs to be created to include the retail store #100.

In the example of FIG. 6, the stores are re-classified to the cluster whose cluster center is closest to TY sales pattern of the store. A confidence score represents the competitive advantage the chosen cluster has over the other clusters. A high value of the confidence score implies that the distance of the store is much closer to the chosen cluster compared to other clusters. A low value of the confidence score implies that the distance of the store from the chosen cluster to the next best cluster is not very great. If the confidence store is extremely low, it means that the retail store is not similar (in sales patterns) to any of the clusters. In this case, the retail store is treated as an outlier and a new cluster created to include the outlier store.

In other aspects, a multi-stage store clustering technique is implemented that utilizes varied and multiple dimensions of data (e.g., demand purchase patterns, transactional and store health indicators, and customer demographic and psychographic information) to determine retail store clustering arrangements. This technique results in the creation of a sales or demand cluster arrangement that can be fine-tuned according to the approaches described elsewhere herein (e.g., the approaches of FIGS. 1-6). Association analysis of the items in a category is used to generate groups of items which are perceived similarly by customers. In aspects, the first stage of store clustering results in the creation of initial sales (or demand-based) clusters, which are created based on the purchase pattern of these item groups.

Some of the approaches described herein use a combination of multiple center-based, hierarchical, and specialized iterative approaches that automatically choose the best algorithm and the optimal number of clusters without any subjective intervention. These approaches are also suitable for handling the variations of all types categories and applicable to stores of any country. The demand-based clustering approaches described herein are flexible in capturing the different variants of demand metrics such as units, dollars, utilization of rest of market and competitor demand, and are easily customizable to account for seasonal and irregular demand spikes.

In aspects, some stores are initially filtered out of the clustering arrangement, which may have noise in the demand pattern and may skew the cluster formation. These stores are later classified into other or new demand clusters based on the customer demographics and/or store health metrics, to mention two examples.

In other aspects, some of the stores that are not performing as per expectation are moved to different demand clusters. The new demand clusters provide a better match for the demographics of the customers in those stores.

In still other aspects, the store clustering process is tied to a mechanism which provides customized forward-looking recommendations. The recommendations improve a store's revenue or footfall, as well as customer satisfaction. These approaches subdivide each demand cluster based upon the volume, velocity, store health metrics and demographics to identify the stores which are in crucial need of improvement. An inter-cluster regression mechanism provides the recommendation, for example, to change item facings and/or the variety of items present in the store to increase the store's performance.

In other aspects, an optimal store clustering solution is provided that accomplishes optimized localization of assortment across a large number of retail stores. For each category combination, the optimal product grouping hierarchy is decided based on a combination of item association, substitutability and product attributes. From the multiple hierarchy levels, a customized combination of product groups is determined automatically based on correlation analysis augmented by group sales share of the category.

The customer purchase pattern is calculated or determined at the selected group level using the current year store-item sales, and can potentially include future demand forecasts. The optimal number of clusters and the optimal clustering algorithm is chosen automatically from a large collection of various segmentation algorithms and a long range of cluster sizes, for example, using parallel computing. As a result, the first stage of demand-based clustering is performed for the optimal cluster size and optimal clustering algorithms.

Subsequently, aspects or characteristics of the clusters are computed at different dimensions to understand the unique features of each demand cluster. Aspects and performance of the clusters are investigated and compared across all clusters and/or against each other to identify over-performing and under-performing stores based on a combination of various store health metrics and weighted scores. The demand clusters may be further be divided into micro-clusters to better understand distinct patterns among the under-performing clusters based on a combination of volume, velocity, store health and customer demographics, to mention a few examples.

Some stores are initially excluded to remove noise from the purchase patterns, for example, very new stores or small-format stores. Also, some under-performing stores can be placed in a different cluster to understand the customer preferences. These are later reclassified into a suitable cluster based on store health and customer demographics.

Based on the above-mentioned steps, a store-cluster assignment is created. This may be overlaid with more local features like regional item preferences, and fixtures and footages to create the store-modular groupings with modular planograms for which the same assortment is planned.

At each cluster level, a recommendation model suggests the action plan in terms of modification of item variety and shelf space to increase the overall store performance. If there is a major change which is required for the store-category combination an alert will be sent to the store manager for changing the product placement and one to the replenishment manager for change in order quantity. Other examples of actions are possible.

Advantageously, the present approaches provide the optimal choice of cluster size and arrangement in an automatic process. The clustering may be based on several algorithms, and is suitable for all types of categories and markets.

In other aspects, the store localization is not only sales or demand-based, but considers the customer demographics or psychographics to make the assortment more customer facing. The present approaches do not force-fit existing demand patterns onto the stores, but, instead are dynamic, forward-looking, and multidimensional.

In others of these embodiments, a system that determines and implements optimal planograms in retail stores to maximize store performance includes a plurality of sales entry devices, a transceiver circuit, a database, and a control circuit.

The sales entry devices are configured to collect sales data at a plurality of retail stores. The transceiver circuit is disposed at a central processing center, and is configured to receive the sales data, and additionally receive product characteristic data for products stocked in the plurality of retail stores. The database is disposed at the central processing center, and is configured to store the sales data and the product characteristic data.

The control circuit is disposed at the central processing center. The control circuit is coupled to the transceiver circuit and the database and is configured to form initial sales clusters of retail stores from the plurality of retail stores according to one of a plurality of algorithms using the product characteristic data and the sales data. Each of the initial sales clusters include a subset of the plurality of retail stores. The selection is effective to maximize the compactness of the initial sales clusters and to minimize the total number of initial sales clusters. Each of the initial sales clusters are assigned an initial planogram.

The control circuit is configured to divide each initial sales cluster into a plurality of velocity buckets. Each of the velocity buckets relates to a velocity of product sales according to the sales data for retail stores in the velocity bucket. The velocity buckets may be implemented as any appropriate data structure.

The control circuit is configured to subsequently divide each velocity bucket into a plurality of micro-clusters. The micro-clusters are defined according to demographic information or store characteristic information.

The control circuit is configured to, using the sales data, determine an importance score and a performance score for each of the micro-clusters. The importance score indicates the relative ranking of a micro-cluster compared to other micro-clusters in accomplishing store performance goals. The performance score indicates the absolute operational performance of the retail stores in the micro-cluster in accomplishing the store performance goals.

The control circuit is configured to selectively determine an optimal sales cluster and a corresponding optimal planogram for each retail store in each micro-cluster based upon the importance score and the performance score. The optimal planogram is selected to maximize store performance.

The control circuit is configured to determine and implement an action based upon the optimal planogram. The action includes using a robot, automated vehicle, or human to stock the stores according to the optimal planogram. The action is communicated to the human, automated vehicle, or robot via the transceiver circuit.

In other aspects, the store performance goal may reflect a variety of different metrics. For example, the goal may be one or more of year-over-year sales trends, year-over-year category growth, market or customer penetration, and or category share of a department. Other examples are possible.

In other examples, the performance score and the importance score reflect differences between a micro-cluster average and a national average.

In one example, the optimal sales cluster is a newly created sales cluster with a newly created planogram. In another example, the optimal sales cluster is one of the initial sales clusters with the initial planogram for the initial sales cluster.

In still other examples, profile information concerning the initial sales clusters, or the micro-clusters is rendered to a user at a user interface.

In aspects, the performance score indicates that the micro-cluster is ideal in performance, over-performing, under-performing, or at-risk of under-performing, and the importance score indicates that the micro-cluster is significant or not significant. By one approach, when a micro-cluster is under-performing and significant, the optimal planogram is a newly created planogram. In another aspect, when a micro-cluster is over-performing and not significant, then the optimal planogram is the same as the original modular planogram of the sales cluster (i.e., the planogram is not changed).

In examples, the algorithms may be any number of different algorithms or approaches. For example, a K-means algorithm, a K-medoids algorithm, a Wards's Clustering algorithm, and/or a Convex Clustering algorithm may be used. Other examples are possible.

In others of these embodiments, an approach is provided that determines and implements optimal planograms in retail stores to maximize store performance. Sales data is collected at a plurality of sales entry devices at a plurality of retail stores. The sales data and product characteristic data for products stocked in the plurality of retail stores is received at a central processing center. The sales data and the product characteristic data is stored at a database at the central processing center.

At control circuit disposed at the central processing center, initial sales clusters of retail stores from the plurality of retail stores are formed according to one of a plurality of algorithms using the product characteristic data and the sales data. Each of the initial sales clusters includes a subset of the plurality of retail stores. The selection is effective to maximize the compactness of the initial sales clusters and to minimize the total number of initial sales clusters. Each of the initial sales clusters is assigned an initial planogram.

Each initial sales cluster is divided by the control circuit into a plurality of velocity buckets. Each of the velocity buckets relates to a velocity of product sales according to the sales data for retail stores in the velocity bucket Subsequently, each velocity bucket is divided into a plurality of micro-clusters by the control circuit. The micro-clusters are defined according to demographic information or store characteristic information.

Using the sales data, the control circuit determines an importance score and a performance score for each of the micro-clusters. The importance score indicates the relative ranking a micro-cluster compared to other micro-clusters in accomplishing store performance goals. The performance score indicates the absolute operational performance of the retail stores in the micro-cluster in accomplishing the store performance goals.

The control circuit selectively determines an optimal sales cluster and a corresponding optimal planogram for each retail store in each micro-cluster based upon the importance score and the performance score. The optimal planogram maximizes store performance. The control circuit determines an action based upon the optimal planogram. The action may be implemented by a human, automated vehicle and/or robot. In examples, the action includes using a robot, automated vehicle, and/or human to stock the stores according to the optimal planogram.

Figure 7:
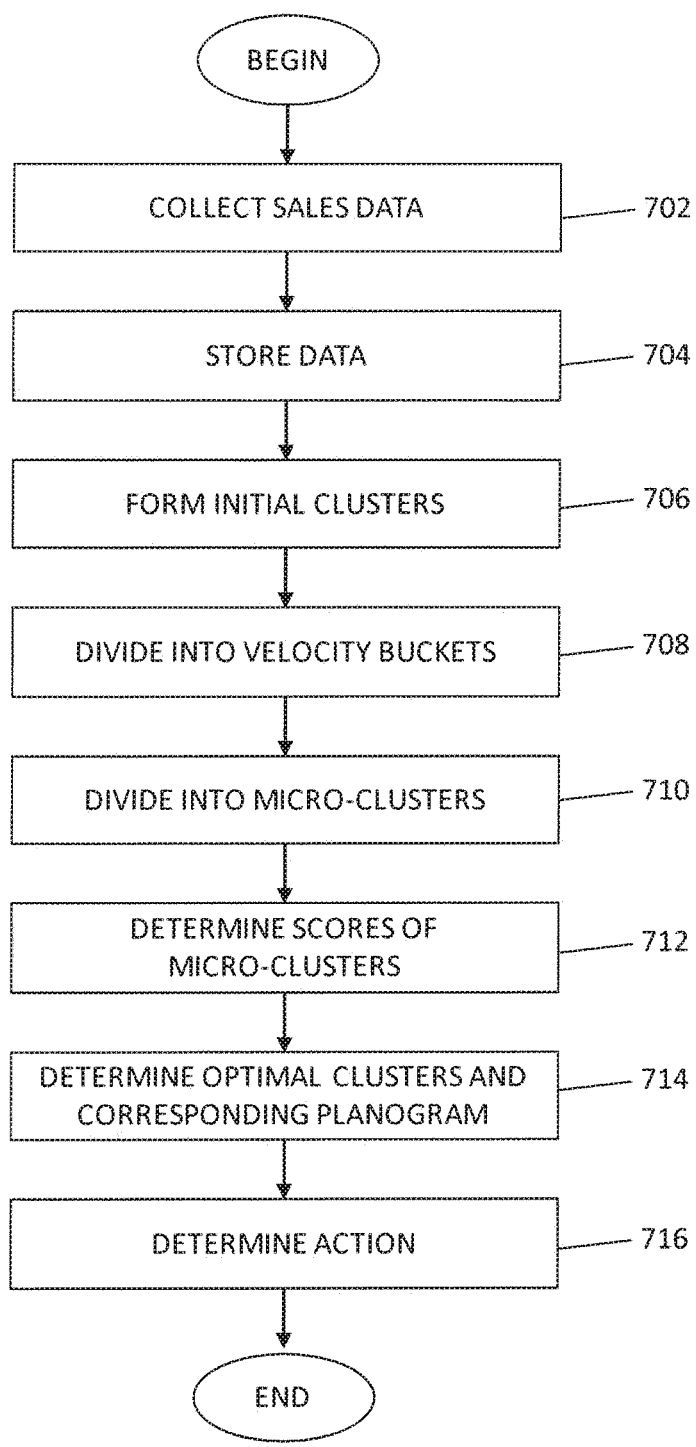
FIG. 7 comprises a flowchart as configured in accordance with various embodiments of these teachings.

Referring now to FIG. 7, an approach is provided that determines and implements optimal modular planograms in retail stores to maximize store performance is described. The approach determines a sales or demand cluster organization, which can be fine-tuned according to the approaches described herein.

At step 702, sales data is collected at a plurality of sales entry devices at a plurality of retail stores. The sales entry devices may be cash registers, scanners, smart phones (that have scanners) or any other similar type of device. The sales data and product characteristic data for products stocked in the plurality of retail stores is received at a central processing center. At step 704, the sales data and the product characteristic data is stored at a database at the central processing center. The database may be any type of memory storage device and the information may be stored as an appropriate data structure.

At step 706 and at control circuit disposed at the central processing center, initial sales clusters of retail stores from the plurality of retail stores are formed according to one of a plurality of algorithms using the product characteristic data and the sales data. Each of the initial sales clusters includes a subset of the plurality of retail stores. The selection is effective to maximize the compactness of the initial sales clusters and to minimize the total number of initial sales clusters. Each of the initial sales clusters is assigned an initial planogram.

In aspects, the items or products are grouped. The grouping of items is necessary so as to visualize the store-clusters easily with respect to profiling them as well as to determine distinctive features between them. The items are labelled at different level like a decision tree, substitutability measures, or the retail store's product attributes.

Final groups for each item are selected after doing a pairwise correlation analysis on the store level aggregated sales value of each level groups, which will reduce the noise of same sales pattern item occurrence in multiple groups. These final groups, which follow different hierarchy, are considered as final variables as one of the input for store-clustering where each item will reside only in one final group/variable.

Store level sales values for current year are calculated for each group as an aggregated value of each items in respective groups which eventually provides total sum of sales of items for each group which are basically now the variables for clustering process and acting as demand of that item group in that store, at a store level which are the observations of the clustering process. Then, each variable's value for every specific store are standardized with respect to the total store sales of that store. This calculation gives sales share of each item groups in that store.

The optimal choice of cluster size and clustering algorithms are then determined. In aspects, highly-correlated variables and variables with very less variance are removed and data is scaled/standardized.

Various compactness measures can also be used. For instance, compactness measures for clustering such as "silhouette measure", "Ratkowsky index", "Dunn index", "Krzanowski and Lai criterion", "Calinski and Harabasz index" may be calculated for different cluster sizes and aggregated after standardizing at cluster size level. Then, cluster size (with maximum of this measure) is recommended as the optimal cluster size, i.e. given the data this number of clusters should be optimum to extract or form the most compact and distinct clusters.

Example algorithms which are used for clustering with the optimal numbers of clusters include K-means algorithms, K-medoids (PAM) with Euclidean distance algorithms, K-medoids (PAM) with Manhattan distance algorithms, Ward's Hierarchical Clustering with Euclidean distance algorithms, Ward's Hierarchical Clustering with Manhattan distance algorithms, and Convex Clustering algorithms. In aspects, the algorithm that has maximum silhouette measure will be recommended for final clustering along with optimal number of clusters.

After clustering with recommended cluster size and cluster algorithm an initial cluster assignment for each store which are called demand or sales clusters. Different actions can be taken. For example, stores corresponding to different clusters are rendered and can be viewed in a map (e.g., a map of the United States) with different colors.

In other examples, item group level sales share for each cluster are aggregated and presented as the clusters profiles. This determination gives the main distinctive features of a specific cluster. Flags may be given for an item group in a specific cluster based on how far the item's sales share value varies from average value at a national scale.

In other aspects, indicators are given for the same to show their YoY sales share significantly high or low. In still other aspects, demographic profiles are shown for individual clusters, which allows a user to obtain which demographic features are significantly distinctive for a specific cluster. Store health comparisons and under-performing store detections may also be made.

For each store, various metrics can also be calculated. For instance, the category share of department may be determined. This metric is the ratio of category sales and department sales multiplied by ratio of number of categories of that department present in that store and total number of categories in that department.

Customer penetration may also be determined. This metric is the ratio of number of households bought from that category in that store and same bought from the department in that store.

The category YoY growth may also be calculated. This metric indicates how much growth the category made in current year compared to the last year in that store.

The YoY trend may additionally be determined. This metric indicates the difference between category YoY growth and department YoY growth.

The store health is determined by aggregating scaled values of above-mentioned metrics for each store. Aggregating store health for each store in a cluster gives a health metric for a specific cluster. Stores having lower percentile store health value are detected as under-performing stores.

At step 708, each initial sales cluster is divided by the control circuit into a plurality of velocity buckets. Each of the velocity buckets relating to a velocity of product sales according to the sales data for retail stores in the velocity bucket.

Subsequently at step 710, each velocity bucket is divided into a plurality of micro-clusters by the control circuit. The micro-clusters are defined according to demographic information or store characteristic information.

At step 712 and using the sales data, the control circuit determines an importance score and a performance score for each of the micro-clusters. The importance score indicates the relative ranking a micro-cluster compared to other micro-clusters in accomplishing store performance goals. The performance score indicates the absolute operational performance of the retail stores in the micro-cluster in accomplishing the store performance goals.

In order to manage the large number of micro-clusters (e.g., >50), the micro-clusters are scored on the basis of how significantly different it is with respect to the national average as well as the cluster average. To achieve this goal, the importance score and the performance score may be used.

In aspects, the importance score is a weighted average of the absolute relative changes of the store traits from the cluster average as well as national average multiplied by the variable importance. In other aspects, the performance score is a weighted average of the relative changes of the store traits from the cluster average as well as national average multiplied by the variable importance, whole multiplied by its velocity bucket index.

The variable importance is obtained from a Random forest model of the sales per footage on the store traits. Other examples are possible.

The micro-clusters identified as being significant on the basis of the importance score are selected for special focus, and the demographics for only these micro-clusters may be profiled.

On the basis of performance score, it can be determined whether the micro-cluster is an ideal or over-performing one or whether it is in risk or an under-performing one. If the micro-cluster is not significant on the basis of importance score or if it is over-performing, then it is suggested that the modular cluster for the stores belonging to these micro-clusters should be the same as the sales cluster to which they belong. If the micro-cluster is significant with respect to the importance score as well as an under-performing store, then a separate modular should be formed for these micro-clusters.

At step 714, the control circuit selectively determines an optimal sales cluster and a corresponding optimal planogram for each retail store in each micro-cluster based upon the importance score and the performance score. The optimal planogram maximizes store performance. The final planograms can be a combination of demand clusters or micro-clusters.

In examples, intra-cluster recommendation may be made. Once the stores are aligned to a demand cluster (or micro-cluster) actionable insights are provided to improve the overall store performance.

The independent variables considered in the model are the selected product group level horizontal facings share and the item penetration (or variety) of the store. Suitable data pre-processing is done with respect to multi-collinearity and outlier detection. A step-wise forward (or backward) linear (or non-linear) regression model is run with suitable regularization. The statistically significant variables are selected based on p-value, in one example.

The lower and upper confidence interval is given for the proportional change in sales amount for unit percentage change in the significant independent variables. For each cluster, the top relevant recommendations are given which will give the maximum increase in store sales performance.

Demographic reclassification for missing and under-performing stores may also be performed. For the initial demand based clustering, some stores are removed initially to reduce the noise in the purchase pattern data, for example, the stores which are opened after the starting date of the clustering period.

Some stores may be excluded from the clusters since they don't carry the entire assortment, e.g. for food and consumables, general merchandising stores can be excluded. The excluded stores need to be allocated some cluster for the assortment planning, but their demand pattern is not reliable. In aspects, these stores are re-classified to one of the existing demand or sales clusters (or micro-clusters) based on the store traits and customer demographics like age, income, ethnicity, etc. using an ensemble of Neural Network, Random Forest and Extreme Gradient Boosting models.

Since the demand clusters are based on past sales pattern, ever-changing customer purchasing patterns need not be captured in other ways. In aspects, the under-performing stores are re-classified to other demand clusters which match the similar customer profiles.

At step 716, the control circuit determines an action based upon the optimal planogram. The action may be implemented by a human, automated vehicle and/or robot. In examples, the action includes using a robot, automated vehicle, and/or human to stock the stores according to the optimal planogram.

Figure 8:
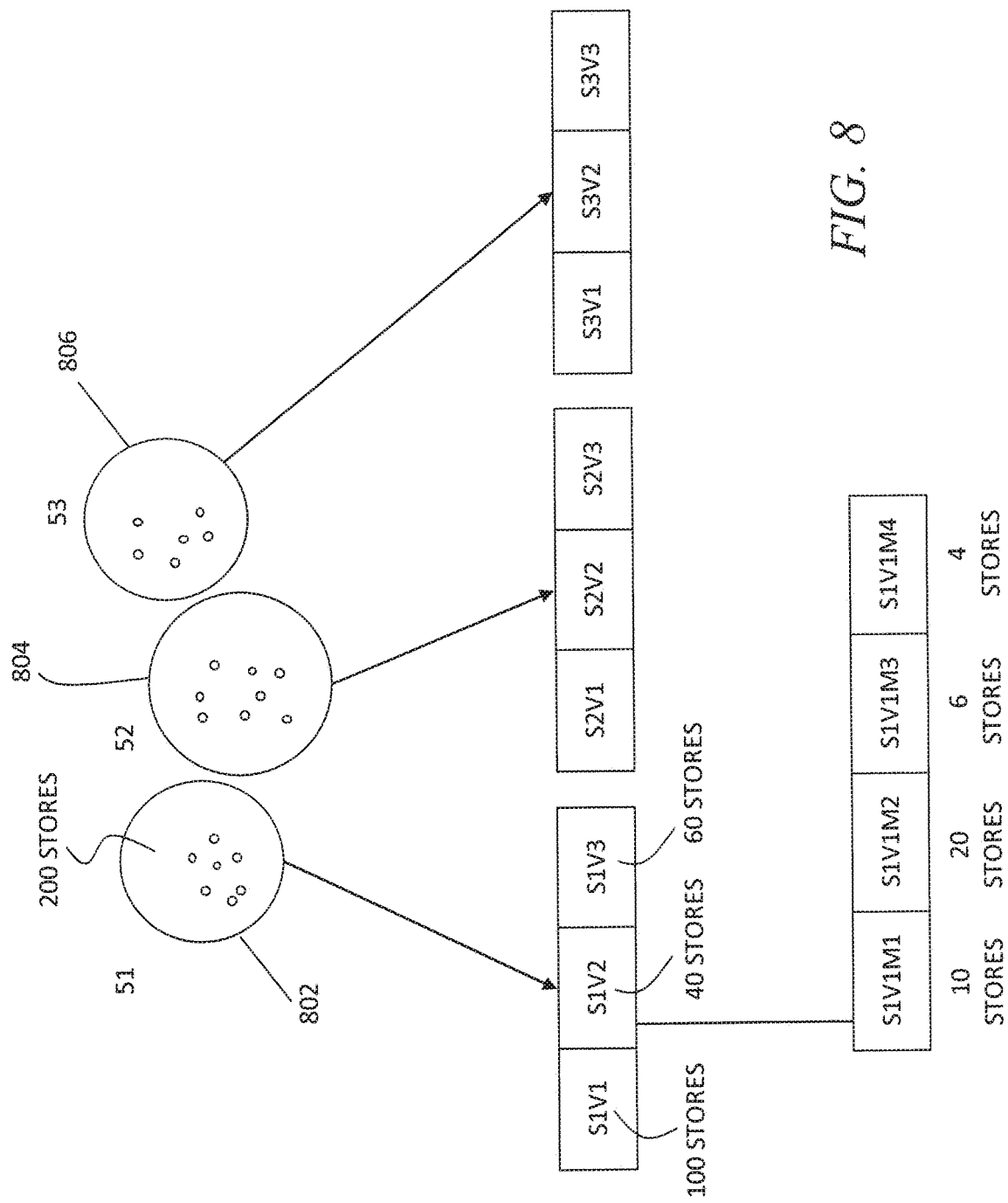
FIG. 8 comprises a diagram as configured in accordance with various embodiments of these teachings.

Referring now to FIG. 8, one example of an approach for determining optimal planograms is described. The approach determines a sales or demand cluster organization, which can be fine-tuned according to the approaches described herein.

In this example, assume there are 1000 stores (e.g., spread across the United States). Based upon the automated choice of cluster size, the recommended cluster size is 3, yielding a first cluster 802 (S1) a second cluster 804 (S2), and a third cluster 806 (S3). S1 contains 200 stores, S2 has 500 stores and S3 has 300 stores.

Each of these clusters 802 (S1), 804 (S2), and 806 (S3) are subdivided into velocity buckets: low, medium and high velocity (V1, V2, V3). Consequently, there are 9 different sub-clusters: S1V1, S1V2, . . . S3V3.

Focusing on the cluster 802 (S1), S1V1 has 100 stores, S1V2 has 40 stores and S1V3 has 60 stores. Now, within each such sub-cluster, the micro-clusters are created using customer demographics, psychographics and other store health metrics. The number of micro-clusters may also be dynamically chosen to increase overall compactness. Suppose in this case, for S1V2 (i.e., Sales cluster 802 (S1) and medium velocity bucket) we have 4 micro-clusters, so these will be represented as S1V2M1 (10 stores), S1V2M2 (20 stores), S1V2M3 (6 stores) and S1V2M4 (4 stores).

This approach can give rise to large number of granular micro-clusters. So, the importance score is used to identify which micro-clusters need to be identified separately to build a separate modular planogram. The importance and performance scores are calculated at micro-cluster level only and not at a store level. Micro-cluster scoring can then take place.

Figure 9:
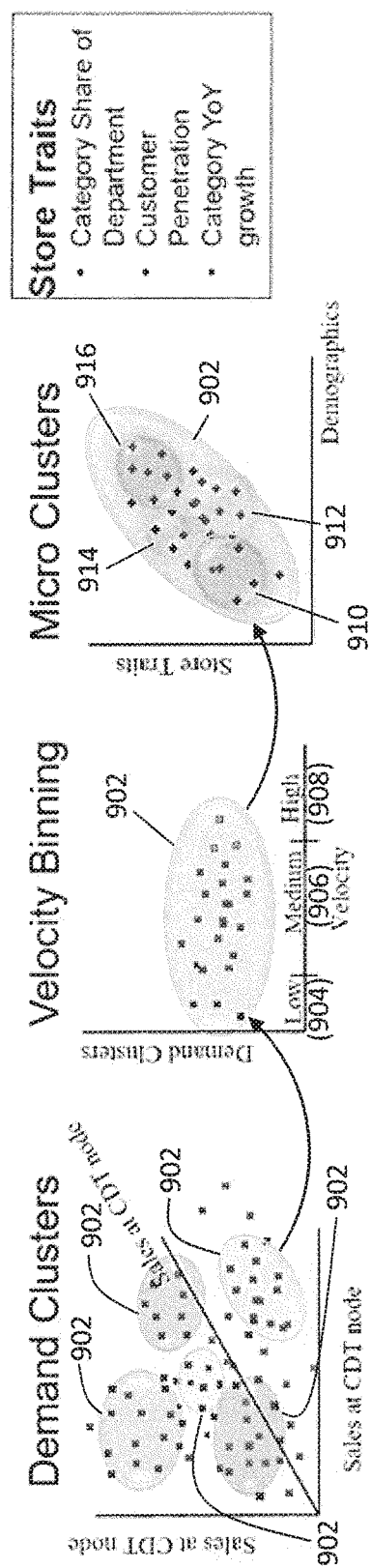
FIG. 9 comprises a diagram as configured in accordance with various embodiments of these teachings.
Figure 10:
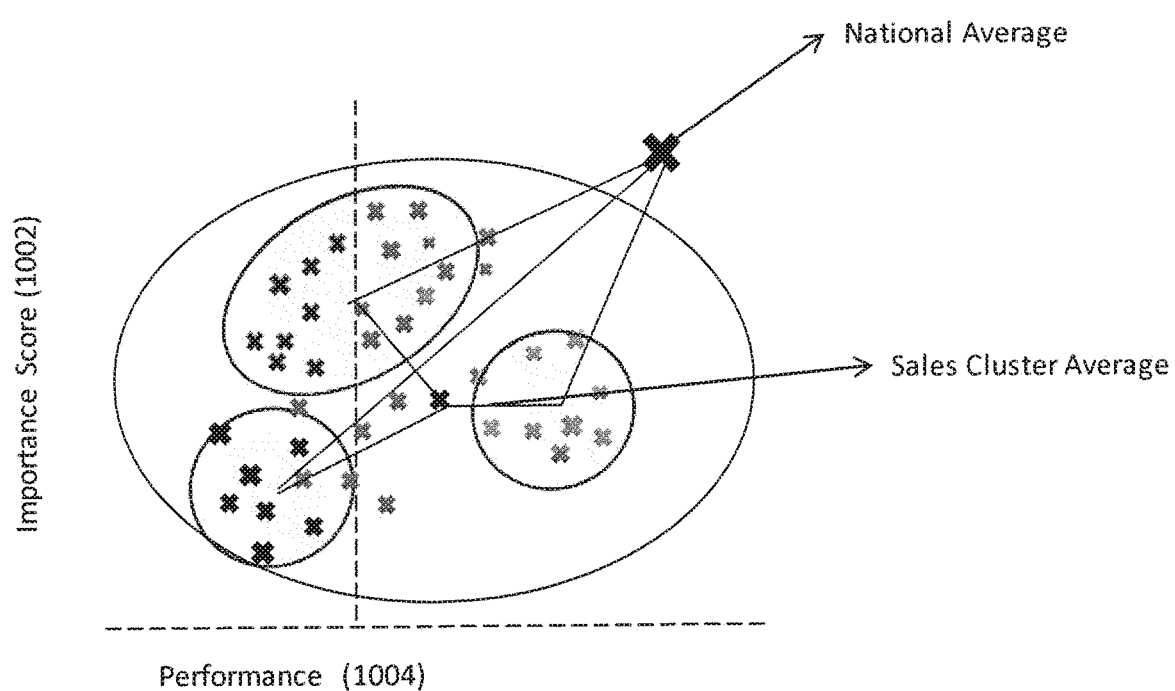
FIG. 10 comprises a diagram as configured in accordance with various embodiments of these teachings.
Figure 11:
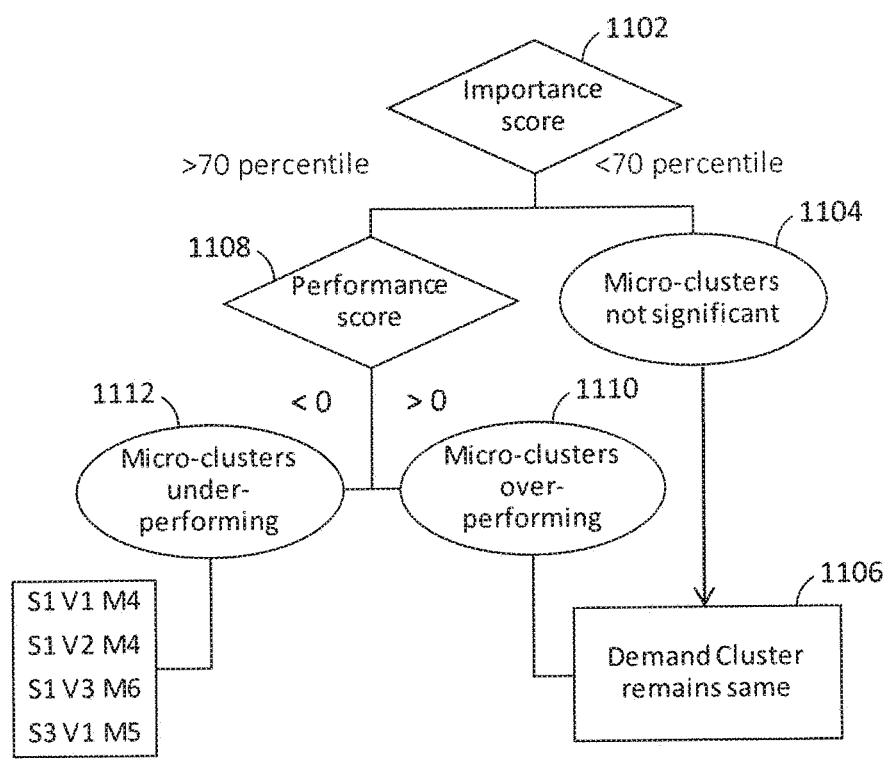
FIG. 11 comprises a flowchart as configured in accordance with various embodiments of these teachings.

Referring now to FIG. 9, FIG. 10, and FIG. 11, more cluster scoring details are described. In these examples, the clustered stores are organized into clusters 902 based on an item product hierarchy (e.g., a customer behavior tree or customer decision tree). In one specific example, dairy sales may include milk and cheese sales. Cheese sales can be broken further into sales of swiss, cheddar, and American cheese.

Each demand cluster is binned according to velocity score into three buckets 904, 906, and 908 as low, medium and high velocity buckets. For each demand cluster-velocity bucket combination, micro clusters are formed based on demographics and store traits. In this example, micro-clusters 910, 912, 914, and 916 are formed.

Referring now especially to FIG. 10 and in order to manage the large number of micro-clusters (e.g., >50), the micro-clusters are scored on the basis of how significantly different it is with respect to the national average as well as the cluster average.

An importance score 1002 and performance score 1005 are used. This approach specifically focuses on those micro-clusters which are significant on the basis of the importance score, and profile the demographics for these micro-clusters only.

On the basis of performance score, determination is made whether the micro-cluster is an ideal or over-performing one or whether it is in risk or an under-performing one. Further, if the micro-cluster is not significant on the basis of importance score or if it is over-performing then we suggest that the modular cluster for the stores belonging to these micro-clusters should be the same as the sales cluster to which they belong. But, if the micro-cluster is significant with respect to the importance score as well as an under-performing store then a separate planogram is formed for these micro-clusters.

The store-traits considered for forming the micro-cluster scores may include:
T1: Category Share of Department;
T2: Customer Penetration; and
T3: YoY trend.

The importance score is a weighted average of the absolute relative changes of the store traits from the cluster average as well as national average multiplied by the variable importance.

The performance score is a weighted average of the relative changes of the store traits from the cluster average as well as national average multiplied by the variable importance, whole multiplied by its velocity bucket index. The variable importance may be obtained from a Random forest model.

In one example, a micro-cluster is significant or in focus if its importance score exceeds the 70th percentile of all stores, i.e., the focus is on the top 30 percentile micro-clusters.

Also, a micro-cluster is over-performing if the performance score is positive and under-performing if it is negative.

Referring now to FIG. 11, one approach for assigning clusters is described. A performance score and an importance score have been obtained as described elsewhere herein.

At step 1102, it is determined if the importance score places the micro-cluster above or (at or) below the $70^{th}$ percentile of other clusters, or the nation, or some other group. If at or below the $70^{th}$ percentile, the cluster is determined to be significant at step 1104, and at step 1106 the demand cluster remains the same.

If the importance score is above the $70^{th}$ percentile, a performance score for the micro-cluster is determined at step 1108. If the score is 0 or positive, the micro-cluster is seen to be over-performing at step 1110, and then 1106 is executed as described above. If the score is negative, at step the micro-cluster is seen as under-performing. In this example, these are micro-clusters S1V1M4, S1V2M4, S1V3M4, and S3V1M5 (using the naming convention described above).

Figure 12:
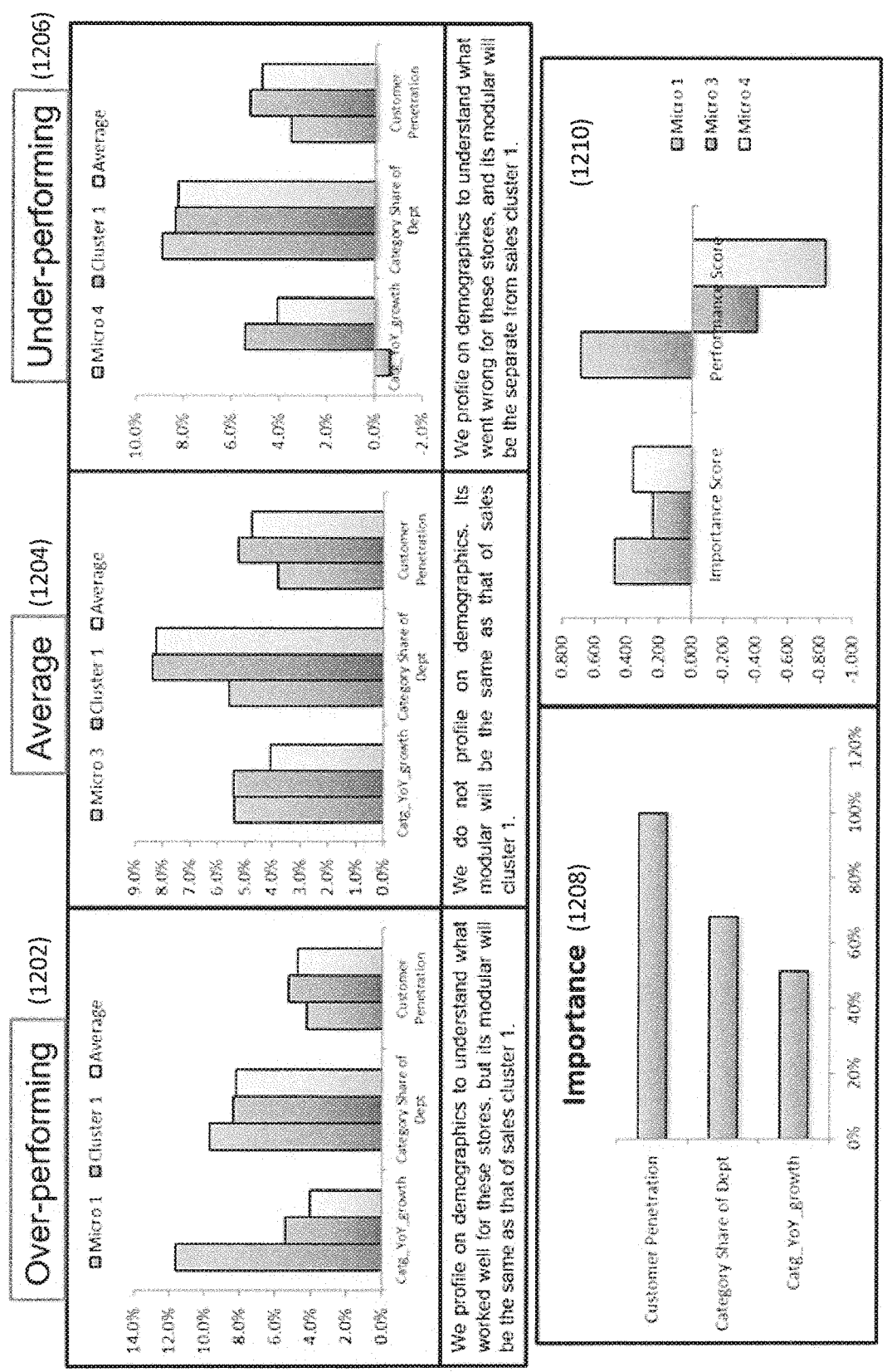
FIG. 12 comprises a diagram as configured in accordance with various embodiments of these teachings.

Referring now to FIG. 12, different displays can be supplied for the user. Various charts 1202, 1204, 1206, 1208, and 1210 show different types of information to a user. These graphs may be rendered to a user visually on a screen, for example, on a personal computer, smartphone, tablet, or laptop.

The chart 1202 shows overperforming stores in a first micro-cluster compared to a first sales cluster and an average. Profiles of the overperforming stores can be made according to demographics to understand what worked well for these stores. The planogram will be the same for the first micro-cluster as the first sales cluster.

The chart 1204 shows average stores in a third micro-cluster compared to the first sales cluster and an average. Profiles of the overperforming stores need not be made on demographics since the performance is only average. The planogram will be the same for the first micro-cluster as the first sales cluster.

The chart 1206 shows underperforming stores in a fourth micro-cluster compared to the first sales cluster and an average. Profiles of the underperforming stores can be made on demographics to understand what went wrong for these stores. The planogram will be the different and separate from the modular planogram of the first micro-cluster as the first sales cluster.

The chart 1208 shows an importance score for one of the micro-clusters. The chart 1210 shows comparisons between the importance and performance scores of the various micro-clusters.

Referring now to FIG. 13, approaches of how sales clusters can be divided into velocity buckets and then micro-clusters are described. As shown four sales clusters 1302, 1304, 1306, and 1308 are divided into various velocity buckets and micro-clusters as shown in column 1310. Stores that are determined to be important or significant are shown with a (*) next to the store identifier. Important (significant) and underperforming stores 1312 may be identified. Stores are identified by sales cluster, velocity bucket, and micro-cluster. Thus, S1V1M1 means that the store is in the first sales cluster, first velocity bucket, and first micro-cluster. This nomenclature is used in some of the other figures described herein.

Referring now to FIG. 14, a display showing only micro-clusters that are important is described. Low performing important stores 1402 are also identified in this chart. The chart shows information concerning stores including the sales cluster, velocity bucket, micro-cluster, YoY growth, Category share of department, consumer segmentation score, importance score, focus, and the modular cluster (either a sales cluster or micro-cluster) to which a store is assigned.

Figure 15:
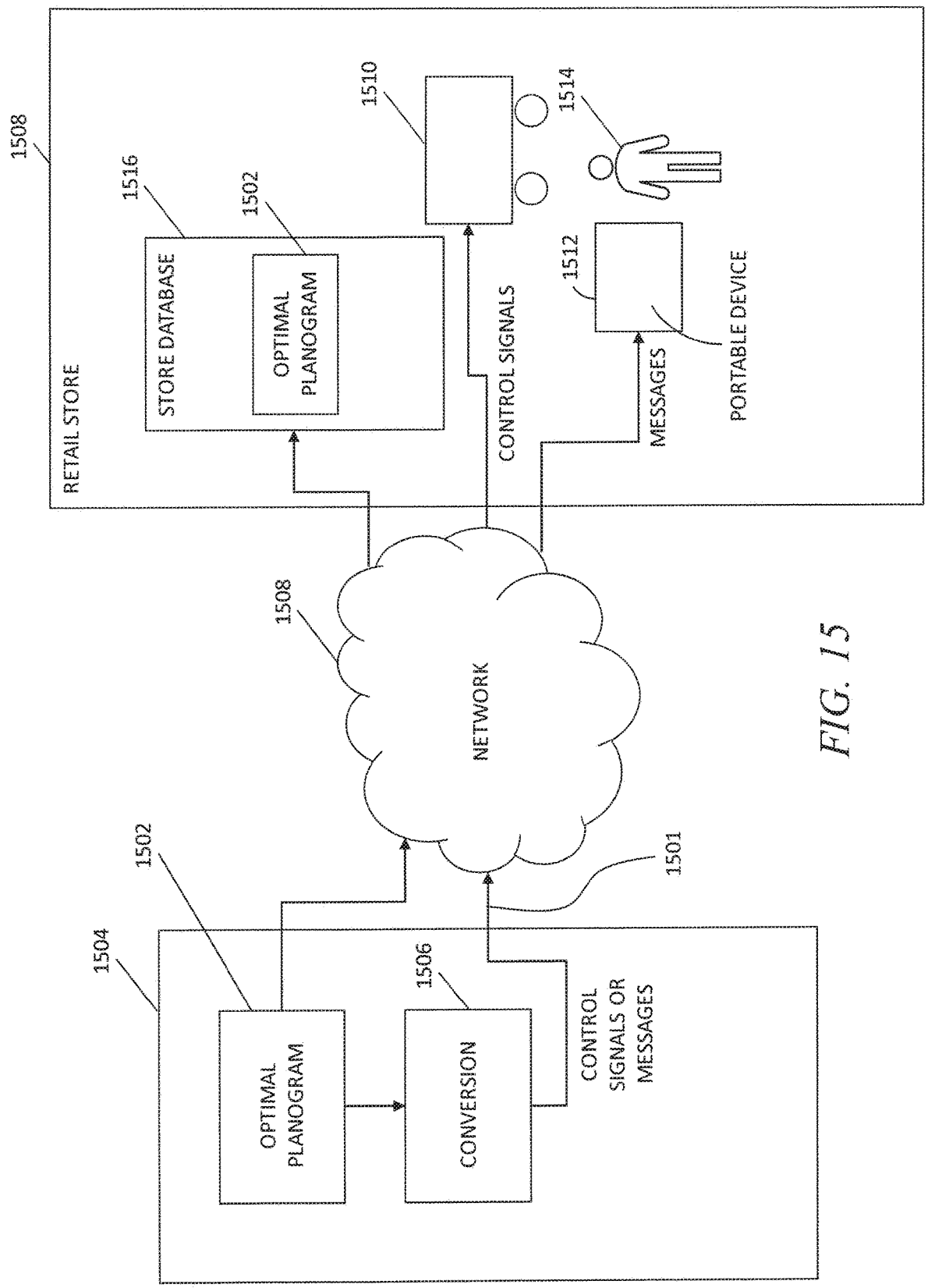
FIG. 15 comprises a diagram as configured in accordance with various embodiments of these teachings.

Referring now to FIG. 15, one example of the implementation of actions is described. In this example, an optimal planogram 1502 has been determined at a central processing center 1504. The optimal planogram 1502 may be determined after any of the approaches for fine-tuning clustering arrangements described herein (e.g., the examples shown in FIGS. 1-6) are implemented or executed. The optimal planogram 1502 is converted by an implementation process 1506 into control signals or messages that implement the planogram 1502. For example, electronic messages or electronic control signals 1501 may be formed that instruct a human, automated vehicle and/or robot to move products to certain locations in a retail store 1508, re-arrange shelving in the retail store 1508, or perform any other action in the retail store 1508 needed to implement the product placement plan described in the planogram 1502. The signals 1501 are transmitted across a communication network 1508 to a robot or automated vehicle 1510 to implement the planogram 1502 or to a user device 1512 (e.g., smartphone, tablet, personal computer, or laptop) of a human 1514 so that the human 1514 can implement the planogram 1502.

In examples, the robot 1510 may examine the planogram and determine how to stock the shelves of a retail store to implement the planogram 1502. For example, the robot 1510 may go to a backroom or storeroom to obtain products for shelving purposes. The robot 1510 may also be configured to move products already present on the shelves, or adjust shelving to implement the planogram 1502.

The planogram 1502 may also be downloaded to a database 1516 and stored at the database 1516. The planogram 1502 can also be implemented from the database 1516. That is, the planogram 1502 may be downloaded to the database 1516, and control signals or messages formed at the retail store 1508 instead of at the central processing center 1504.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for updating planograms that are used to arrange products in retail stores, the system comprising:
    a plurality of sales entry devices that are configured to collect current sales data at a plurality of retail stores during a current sales period;
    a transceiver circuit disposed at a central processing center, the transceiver circuit being configured to receive the current sales data;
    a database disposed at the central processing center that is configured to store the current sales data and additionally store a representation of existing sales clusters of retail stores, each of the existing sales clusters including a subset of the plurality of retail stores such that each retail store belongs to one of the existing sales clusters, each of the existing sales clusters being assigned an existing planogram;
    a control circuit that is disposed at the central processing center, the control circuit being coupled to the transceiver circuit and the database, the control circuit being configured to:
    based upon the current sales data, determine transition information that identifies retail stores that have potentially moved from an original one of the existing sales clusters to a different one of the existing sales clusters, wherein the transition information relates to Euclidian distances between retail stores that have moved and the existing sales clusters;
    based upon the transition information for all the retail stores, determine an average cluster retention score, the average cluster retention score being a numeric measure of how many retail stores have moved from original to different existing sales clusters in the current sales period;
    when the average cluster retention score is below a predetermined threshold, perform a complete re-organization of the existing sales clusters based at least in part upon the current sales data, wherein the complete reorganization does not necessarily keep any of the existing sales clusters;
    when the average cluster retention score is above the predetermined threshold, determine whether each retail store should be re-classified as belonging to a different existing sales cluster or should be placed in a newly created sales cluster;
    determine an optimal planogram for each retail store based at least in part upon whether a complete re-organization is performed, whether the retail store is re-classified as belonging to a different existing sales cluster, or whether the retail store is placed in a newly created sales cluster, the optimal planogram when implemented being effective to maximize store performance;
    selectively implement an action based upon the optimal planogram, the action at least in part using an automated vehicle or robot to stock shelving units in the stores according to the planogram, the stocking being accomplished by moving or rearranging products within the retail stores to the shelving units in the retail stores, the action also including reconfiguring at least one of the shelving units in at least one of the plurality of retail stores;
    wherein the determination of whether retail stores are re-classified or placed in a newly created cluster is based upon a confidence score, the confidence score indicating the likelihood a particular retail store belongs to an existing sales cluster and wherein the confidence score is indicative of a distance of the particular store to the existing sales cluster;
    wherein a first value of the confidence score indicates that the particular retail store is closer to the existing cluster compared to the other clusters, wherein a second value of the confidence score that is less that the first value indicates the particular retail store is at a similar distance as between two clusters, and wherein a third value of the confidence score that is lower than the second value indicates that particular retail store should be place in the newly created cluster.

2. The system of claim 1, wherein the transition information is organized according to a transition matrix that indicates transitions of the retail stores between different ones of the existing sales clusters.

3. The system of claim 1, wherein the optimal planogram is an existing planogram or a newly-created planogram.

4. The system of claim 1, wherein the existing sales clusters each have a cluster center, and the retail store is re-classified to the existing sales cluster having the closest cluster center to the retail store according to the current sales data.

5. The system of claim 1, wherein the current sales data is this-year sales data.

6. A method for updating planograms that are used to arrange products in retail stores, the method comprising:
    collecting current sales data at a plurality of sales entry devices at the plurality of retail stores during a current sales period;

receiving the current sales data at a central processing center;

storing the current sales data and a representation of existing sales clusters of retail stores at a database disposed at the central processing center, each of the existing sales clusters including a subset of a plurality of retail stores such that each retail store belongs to one of the existing sales clusters, each of the existing sales clusters being assigned an existing planogram;

based upon the current sales data and at a control circuit that is disposed at the central processing center, determining transition information that identifies retail stores that have potentially moved from an original one of the existing sales clusters to a different one of the existing sales clusters, wherein the transition information relates to Euclidian distances between retail stores that have moved and the existing sales clusters, based upon the transition information for all the retail stores, determining at the control circuit an average cluster retention score, the average cluster retention score being a numeric measure of how many retail stores have moved from original to different existing sales clusters in the current sales period, when the average cluster retention score is below a predetermined threshold, performing at the control circuit a complete re-organization of the existing sales clusters based at least in part upon the current sales data, wherein the complete reorganization does not necessarily keep any of the existing sales clusters, when the average cluster retention score is above the predetermined threshold, determining at the control circuit whether each retail store should be re-classified as belonging to a different existing sales cluster or should be placed in a newly created sales cluster, determining at the control circuit an optimal planogram for each retail store based at least in part upon whether a complete re-organization is performed, whether the retail store is re-classified as belonging to a different existing sales cluster, or whether the retail store is placed in a newly created sales cluster, the optimal planogram when implemented being effective to maximize store performance, and at the control circuit selectively implementing an action based upon the optimal planogram, the action at least in part using an automated vehicle or robot to stock shelving units of the stores according to the planogram, the stocking being accomplished by moving or rearranging products within the retail stores to the shelving units in the retail stores, the action also including reconfiguring at least one of the shelving units in at least one of the plurality of retail stores;

wherein the determination of whether retail stores are re-classified or placed in a newly created cluster is based upon a confidence score, the confidence score indicating the likelihood a particular retail store belongs to an existing sales cluster and wherein the confidence score is indicative of a distance of the particular store to the existing sales cluster;

wherein a first value of the confidence score indicates that the particular retail store is closer to the existing cluster compared to the other clusters, wherein a second value of the confidence score that is less that the first value indicates the particular retail store is at a similar distance as between two clusters, and wherein a third value of the confidence score that is lower than the second value indicates that particular retail store should be place in the newly created cluster.

7. The method of claim 6, wherein the transition information is organized according to a transition matrix that indicates transitions of the retail stores between different ones of the existing sales clusters.

8. The method of claim 6, wherein the optimal planogram is an existing planogram or a newly-created planogram.

9. The method of claim 6, wherein the existing sales clusters each have a cluster center, and the retail store is re-classified to the existing sales cluster having the closest cluster center to the retail store according to the current sales data.

10. The method of claim 6, wherein the current sales data is this-year sales data.

* * * * *

UNITED STATES PATENT AND TRADEMARK OFFICE
CERTIFICATE OF CORRECTION

PATENT NO. : 11,276,033 B2
APPLICATION NO. : 16/205604
DATED : March 15, 2022
INVENTOR(S) : Somedip Karmakar, Sourit Manna and Gayatri Pal It is certified that error appears in the above-identified patent and that said Letters Patent is hereby corrected as shown below:

In the Claims

Claim 1, Column 20, Line 44, delete "less that" and insert -- less than --, therefor.

Claim 6, Column 22, Line 21, delete "less that" and insert -- less than --, therefor.

Signed and Sealed this
Thirteenth Day of September, 2022

Katherine Kelly Vidal
*Director of the United States Patent and Trademark Office*